United States Patent
Gonzalez et al.

(10) Patent No.: US 7,344,173 B2
(45) Date of Patent: Mar. 18, 2008

(54) COOKING DEVICE WITH HANDLES

(75) Inventors: Mario Mata Gonzalez, Kenosha, WI (US); Karol Polaczek, Hickory Hills, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 10/974,438

(22) Filed: Oct. 27, 2004

(65) Prior Publication Data

US 2006/0087135 A1    Apr. 27, 2006

(51) Int. Cl.
*A47J 45/10*      (2006.01)
*A47J 37/06*      (2006.01)

(52) U.S. Cl. .................... 294/27.1; 294/26; 294/144; 99/423

(58) Field of Classification Search ............... 294/27.1, 294/31.1, 144, 26, 29, 32, 141; 16/422, 425; 220/770, 772, 775, 776, 773; 99/422–424
See application file for complete search history.

(56) References Cited

U.S. PATENT DOCUMENTS

| | | | |
|---|---|---|---|
| 111,835 A * | 2/1871 | Gail ............................. 99/423 |
| 625,955 A * | 5/1899 | Kendle ........................ 220/759 |
| 1,333,917 A * | 3/1920 | Hollands ..................... 220/762 |
| 1,487,739 A | 3/1924 | Harris | |
| 1,566,234 A | 12/1925 | Seward | |
| 1,627,880 A | 5/1927 | Baxter | |
| 1,670,732 A | 5/1928 | Montgomery | |
| 1,716,780 A | 6/1929 | Kennedy et al. | |
| 1,876,358 A * | 9/1932 | Stough ..................... 126/390.1 |
| 2,011,125 A | 8/1935 | Small | |
| 2,073,475 A | 3/1937 | Gordon | |
| 2,148,439 A * | 2/1939 | Crawford .................... 206/216 |
| 2,262,273 A | 11/1941 | Ferrara | |
| 2,271,901 A * | 2/1942 | Smith et al. .................. 294/26 |
| 2,362,720 A | 11/1944 | Reichart | |
| 2,712,151 A | 7/1955 | Becht | |
| 2,756,566 A * | 7/1956 | Sampson et al. ............. 62/300 |
| 3,203,029 A | 8/1965 | Serio | |
| 3,342,517 A | 9/1967 | Pryce | |
| 3,347,404 A | 10/1967 | McIntyre | |
| 3,420,401 A | 1/1969 | Maslow | |
| 4,119,021 A | 10/1978 | Moses ......................... 99/425 |
| 4,171,144 A | 10/1979 | Rodriguez ................... 294/30 |

(Continued)

*Primary Examiner*—Dean J Kramer
(74) *Attorney, Agent, or Firm*—David I. Roche; Daniel A. Tallitsch; Baker & McKenzie LLP (57) ABSTRACT

Removable handles for use with a cooking utensil. In the preferred embodiment of the present inventions, the cooking utensil is a griddle which is intended for use on a grill to provide for the frying of foods. The removable handles are easily put into or out of engagement with a griddle, and have downwardly extending legs which elevate and support the griddle when placed on a flat surface. It is intended that the handles be removed from the griddle during the period of time that the griddle is used for cooking, such that the handles and leg supports always remain cook. Thus, when the food is cooked, the griddle can be removed from the grill using the handles without the use of oven mitts. Furthermore, the griddle can be set on a flat surface for use as a serving platter. Because the legs will elevate the griddle, it is not necessary to use trivets to prevent heat damage to the surface.

21 Claims, 5 Drawing Sheets

U.S. PATENT DOCUMENTS

| | | | |
|---|---|---|---|
| D256,081 S | * | 7/1980 | Patterson et al. ............ D3/311 |
| 4,296,880 A | * | 10/1981 | Olshefsky ................... 294/144 |
| 4,345,516 A | | 8/1982 | Sinclair ....................... 99/426 |
| 4,717,038 A | * | 1/1988 | Anders ....................... 220/769 |
| 4,930,491 A | | 6/1990 | Purello ....................... 126/332 |
| 5,678,531 A | | 10/1997 | Byers et al. .............. 126/25 R |
| 5,918,535 A | * | 7/1999 | Moreau ....................... 99/413 |
| 6,393,973 B1 | | 5/2002 | Velo et al. ................... 99/422 |

* cited by examiner

COOKING DEVICE WITH HANDLES

BACKGROUND AND SUMMARY OF THE INVENTIONS

The inventions described and claimed herein relate generally to cooking utensils that are used over a heat source for cooking food. Specifically, the preferred embodiment of the inventions described herein is a griddle which is intended for use on an outdoor grill. The griddle of the present invention is used in conjunction with two removable handles having downwardly extending legs for elevating and supporting the griddle after the griddle is removed from the grill and set on a table or other flat surface.

It is well known in the art to use a griddle on an outdoor grill. Preferably, the griddle only covers a portion of the grill cooking surface to allow for simultaneous charbroiling and frying of food. For example, U.S. Pat. No. 4,930,491 ("the '491 patent") discloses a portable combination cooking grill which is laid directly on top of the grill cooking surface and has both a griddle section and a charbroil section. The '491 patent discloses detachable handle means for removing the cooking grill from the surface of the grill and moving it to a remote location so that the cooking grill can be used as a food server.

It is also known in the art to use legs on a griddle for elevating the griddle above a heat source. For example, U.S. Pat. No. 4,119,021 (the '021 patent") discloses a frying attachment which resembles a griddle. The frying attachment of the '021 patent is comprised of a rectangular flat tray with four integral legs at each corner for elevating the tray above burners on a stove deck. The legs in the '021 patent are fixed to the griddle and cannot be removed. U.S. Pat. No. 5,678,531 ("the '531 patent") discloses a griddle attachment which can be used on a grill or above an open fire. When the griddle from the '531 patent is used over an open fire, U-shaped legs are secured to lips on opposite sides of the grill to elevate the griddle above the fire. However, the legs in the '531 patent are secured via studs which makes it difficult to install and remove the legs.

It is well known in the art to use removable handles in conjunction with utensils, such as pots and pans. Removable handles, such as those disclosed in U.S. Pat. Nos. 6,393,973, 4,345,516, 3,347,404, 2,073,475, and 1,716,780, are useful when cooking in or on a cook top burner, a campfire, or an oven. During the period of time that the utensil is located on the heat source, the handle can be removed. Because the handles remain cool, it is not necessary to use oven mitts to remove the utensil from the heat source; instead the handles can simple be re-engaged with the utensil. Another recognized benefit of using removable handles is that the pot or pan will take up less space in a dishwasher. When using a removable handle of the prior art to remove a pot or pan from a heat source, one cannot simply set the pot or pan on a table or other surface. Instead, one must use a trivet in order to prevent heat damage to the surface.

Thus, there is a need for removable handles which incorporate support members or legs for elevating the cooking utensil after it is removed from the cooking surface. By integrating support members with removable handles, the support members will also remain cool during the cooking process. There is also a need for removable legs or support members for use with a griddle that can be easily engaged. It is therefore a primary object of the present inventions to provide removable handles that have downwardly extending supports or legs for handling and elevating a cooking utensil.

The preferred embodiment of the present invention comprises a griddle that is intended to be used on an outdoor grill. The griddle is sized to cover only a portion of the grill surface so that the user can both charbroil and fry foods at the same time. The griddle is also intended to be used as a serving platter after the foods are cooked, and thus has two projecting rims on opposite sides which are configured to accept two removable handles. Instead of removing the food when cooked, a user simply engages the two removable handles with the griddle, which does not require the use of tools. To enable the griddle to be used as a serving platter, the two removable handles both have downwardly extending legs which serve to elevate the griddle when placed on a table or other flat surface to prevent heat damage to the surface. Thus, it is not necessary to use a trivet with a griddle of the present invention. It may be advantageous to use the griddle as a serving platter because the food will stay warm for a longer period of time.

It is important to note that the removable handles of the present invention are not limited to use with a griddle. Any number of utensils, such as pots, pans, and trays, could be adapted for use with the removable handles of the present invention. The term utensil or cooking utensil as used in this document means any instrument, implement, or container that is used in a cooking application (which includes outdoor grilling), and is not limited to items that are used in proximity of a heat source.

BRIEF DESCRIPTION OF THE DRAWINGS

These and other features, aspects, objects, and advantages of the inventions described and claimed herein will become better understood upon consideration of the following detailed description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF THE DRAWINGS

Figure 1:
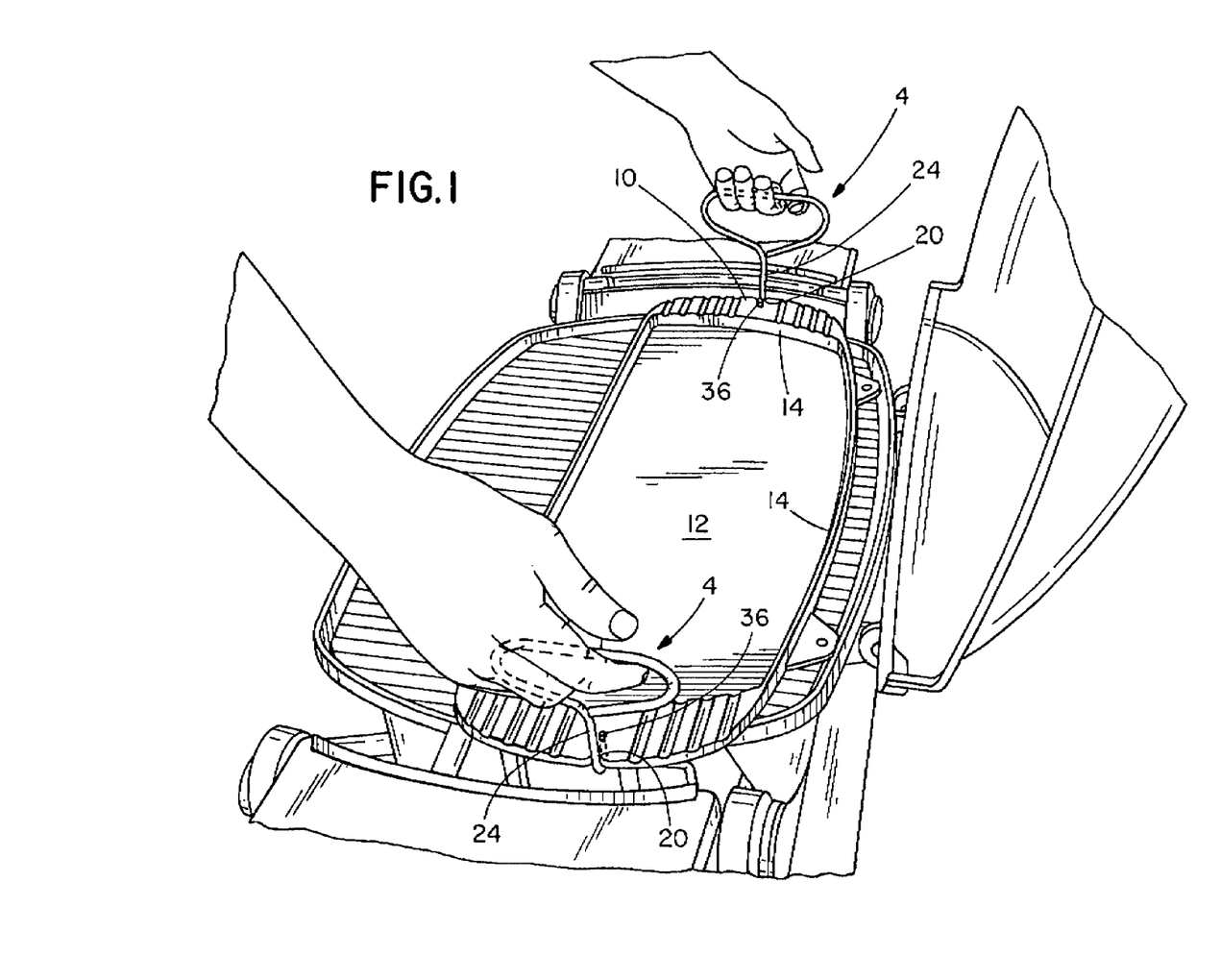
FIG. 1 is a perspective view of a griddle set on top of a grill and engaged with removable handles made in accordance with the inventions described and claimed herein.

Referring first to FIG. 1, a perspective view of a preferred embodiment of a griddle 2 set atop the cooking surface 8 of a grill 6 is shown. It is preferable that the griddle 2 cover only a portion of the grill cooking surface 8 so that foods can be simultaneously charbroiled on the grill cooking surface 8 and fried on the griddle cooking surface 12. The griddle cooking surface 12 preferably has a shape which corresponds to the shape of the grill cooking surface 8. In FIG. 1, the griddle 2 is shown covering the rear half of the grill cooking surface 8. However, the griddle 2 could be moved to the front of the grill cooking surface 8, which, in the preferred embodiment, would require the griddle to be turned 180°. Although the griddle 2 of the present invention is preferably used with a grill 6, it is important to note that the griddle 2 can be modified for use in conjunction with other heat sources, such as an oven, a stove top burner, and an open fire. The griddle 2 is preferably made of cast iron.

Figure 2:
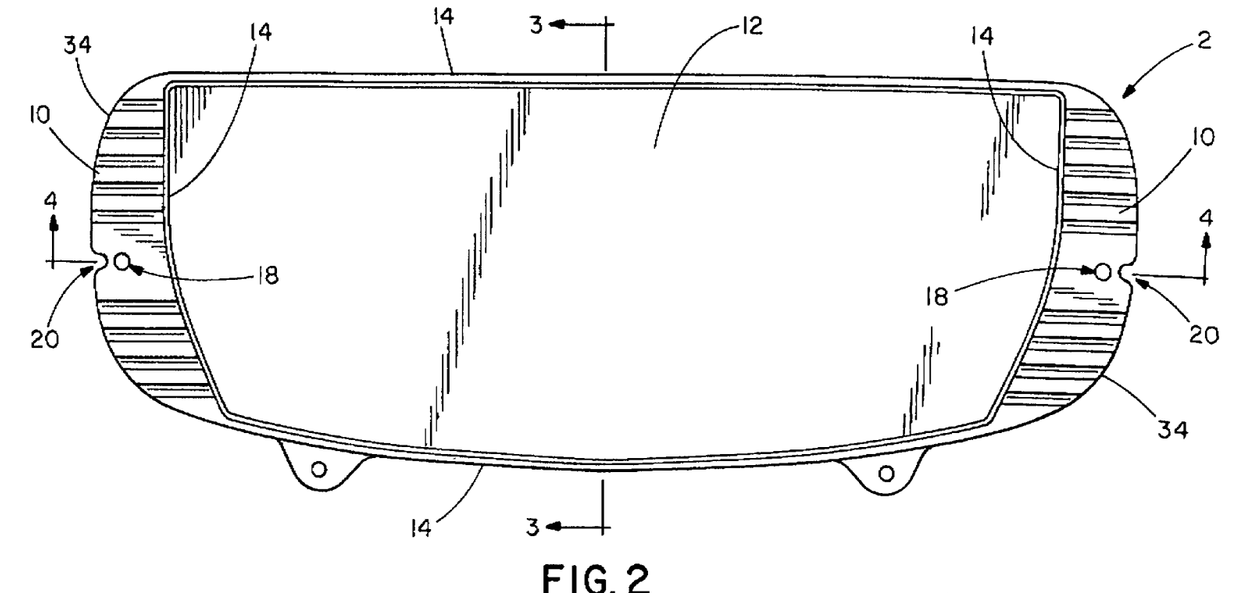
FIG. 2 is a top view of the preferred embodiment of the griddle.
Figure 3:
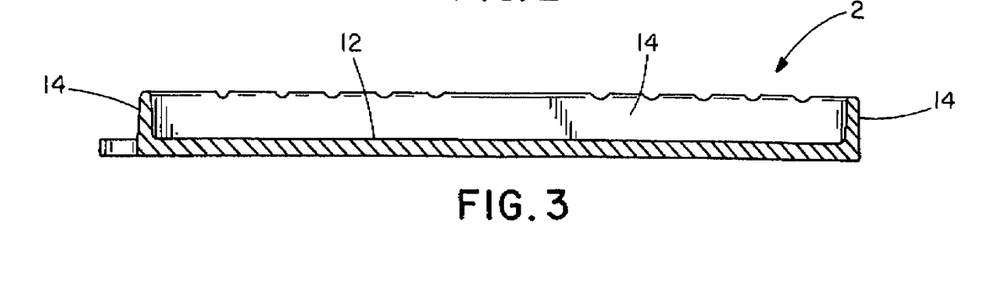
FIG. 3 is a sectional view of the griddle, defined as Section 3-3 in FIG. 2.
Figure 4:
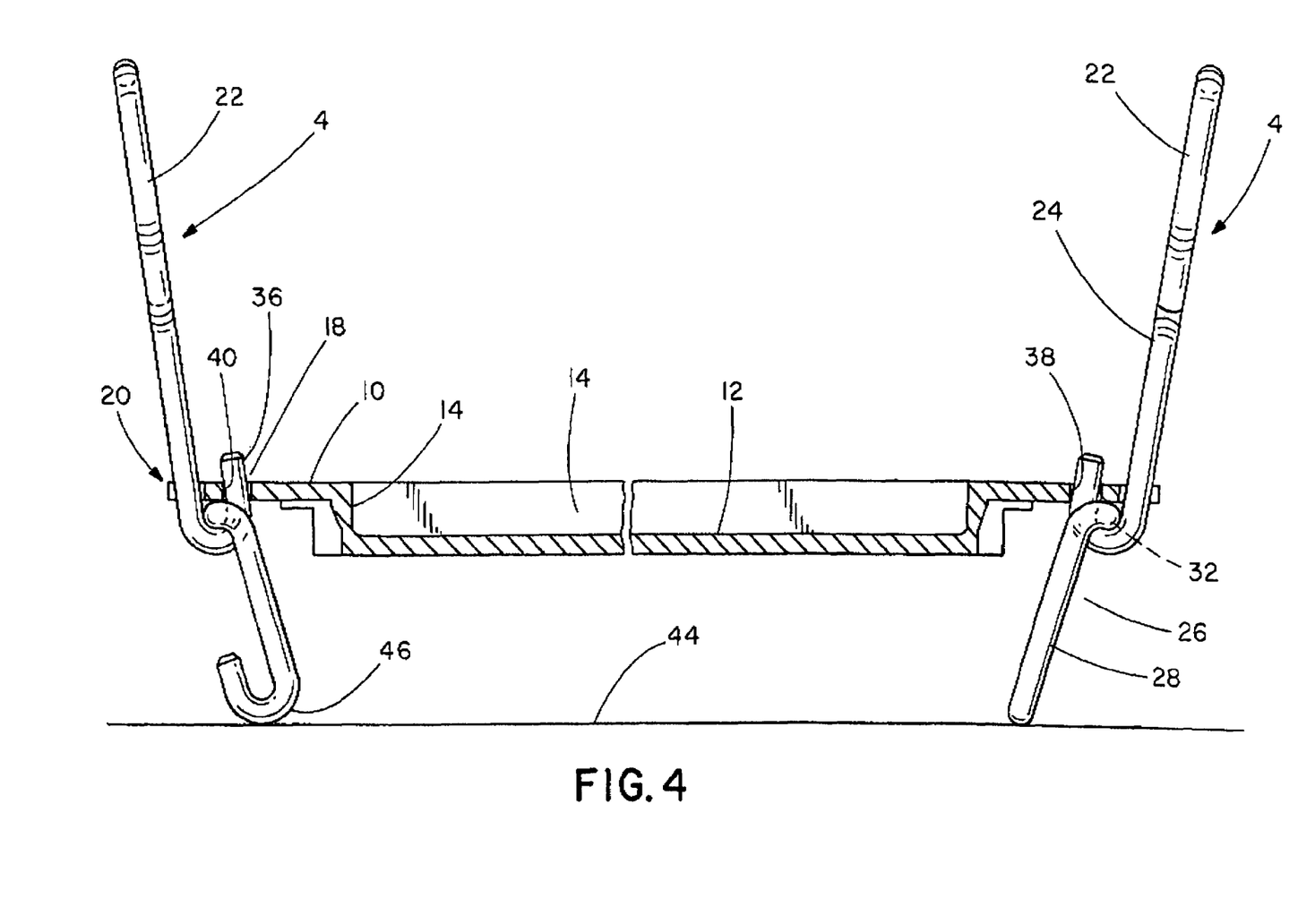
FIG. 4 is a sectional view of the griddle, defined as Section 4-4 in FIG. 2 (note that the griddle is shown engaged with handles of the present invention and is set on top of a flat surface)

As shown in FIGS. 2, 3, and 4, the griddle cooking surface 12 is preferably a flat horizontal surface; however, the griddle cooking surface 12 is not necessarily limited to a flat surface and could incorporate grease channels. A griddle 2 of the present invention preferably has vertical walls 14 peripheral to and extending upwardly from the griddle surface and has two rims 10 which project outwardly from the top of two opposing vertical walls 14. Referring back to FIG. 1, the two rims 10 preferably have an arcuate periphery and extend past the side edges 16 of the grill 6. In an alternative embodiment, the rims 10 could project directly from the griddle cooking surface 12.

Traditionally, a grill top griddle 2 is used as a cooking device and not as a serving device. Generally, a cook will remove the cooked food from the griddle 2, and leave the griddle 2 on the grill 6 to cool. However, instead of removing the cooked food from the griddle 2, it may be preferable to leave the food on the griddle 2 and instead remove the griddle 2. This would enable the cook to use the griddle 2 as a serving tray which will keep the food warm. A cook would typically remove the griddle 2 with oven mitts and would set the hot griddle 2 on top of a trivet. However, the griddle 2 of the present invention is designed to receive and engage with two removable handles 4 which have integral support members 26 for elevating the griddle 2 when the griddle 2 is set on top of a table or other flat surface.

Figure 5:
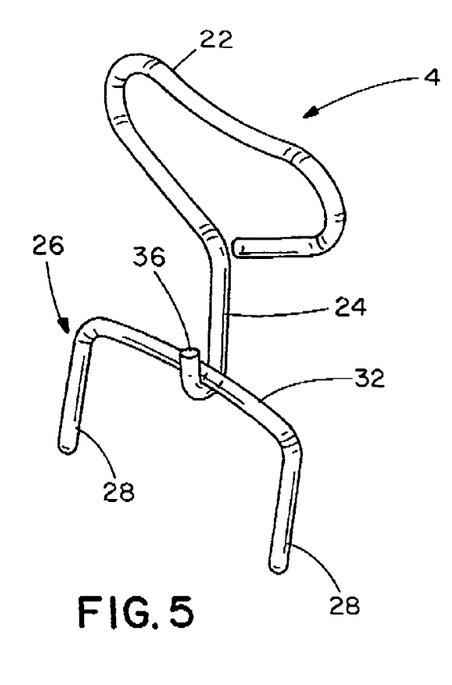
FIG. 5 is a perspective view of the removable handle.

Referring back to FIG. 1, the removable handles 4 are shown in engagement with the griddle 2 which is on top of the grill cooking surface 8. Preferably, the removable handles 4 are used to place and position the griddle 2 on the top of the grill cooking surface 8, effectively keeping the cooks hands away from the heat source. Once the griddle 2 is placed in the desired position, the handles are intended to be removed and set aside to prevent the handles 4 from getting hot, at which point the cook will use the griddle 2 to cook food. Once the food is done, the handles 4 are again placed in engagement with the griddle 2, as shown in FIG. 5. Holding onto the handles 4, the cook would remove the griddle 2 from the grill cooking surface and set the griddle 2 on a table or other flat surface, without removing the handles 4 from engagement. The griddle 2 does not come in contact with the table; instead, the depending support members 26 elevate the griddle 2 to prevent heat damage to the table.

The removable handles 4 are designed to be interchangeable (i.e., can be used on either side of the griddle) and each handle 4 is preferably comprised of two sections of cold rolled steel which are formed and welded together, as is best shown in FIGS. 5 through 8. The first section of cold rolled steel is formed into a gripping member 22 and a downwardly depending J-shaped vertical arm 24. It is important to note that the arm is not necessary and, if present, the arm does not necessarily have to be J-shaped. All that is necessary is that the handle have an upwardly projecting prong 36 for engaging with the griddle.

In the preferred embodiment, the gripping member 22 takes form as an arcuate loop, the top of which is ergonomically shaped to be gripped by human hands. The gripping member 22 is preferably uncoated or uncovered, but could be coated or covered with a non-flammable and/or heat resistant material. The gripping member 22 is not limited to an arcuate loop and could take any form that would be capable of being gripped by a human hand. For example, in an alternative embodiment, the gripping member 22 could take form as a horizontal member which extends outwardly from the top of the vertical arm 24.

Figure 6:
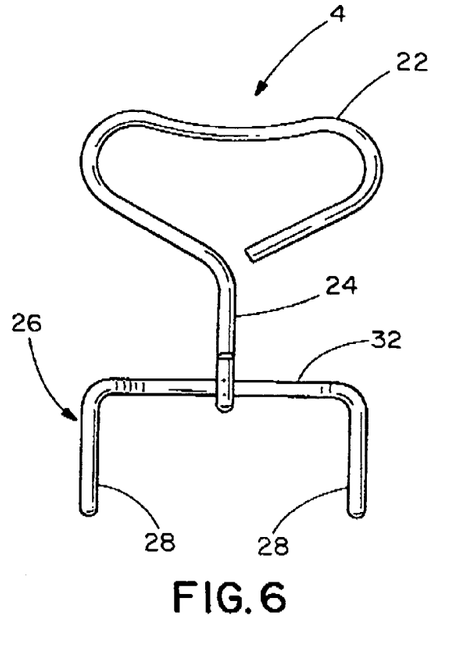
FIG. 6 is a front view of the removable handle.
Figure 7:
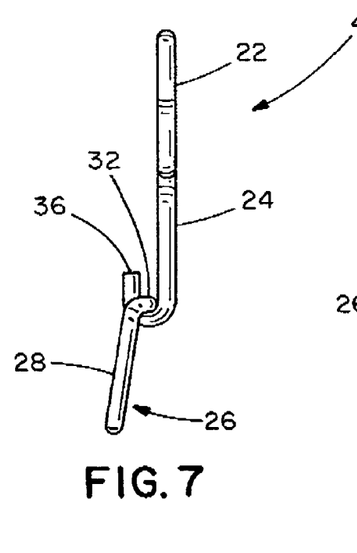
FIG. 7 is a side view of the removable handle.
Figure 8:
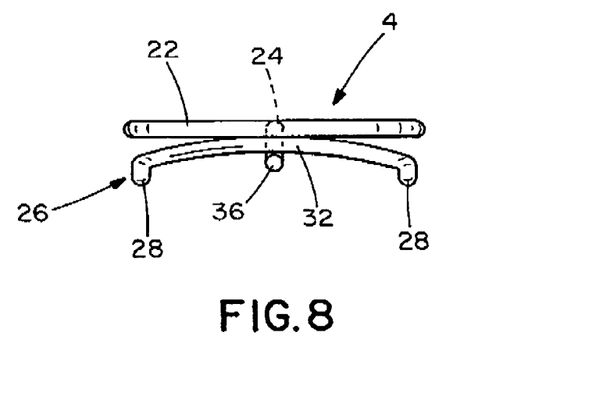
FIG. 8 is a top view of a removable handle.

The second section of cold rolled steel is formed into a support member 26 which is preferably shaped like an inverted U. The support member 26, thus, has two legs 28 which downwardly depend from opposite ends of an horizontal interconnecting member 32. Referring now to FIGS. 6 and 7, the support member 26 is located in a plane approximately perpendicular to the plane in which the J-shaped vertical arm is located. The interconnecting member 32 is preferably attached to the J-shaped vertical arm 24 at the inside of the bend in the vertical arm by a tack weld 30. As shown in FIG. 8, a top view of the removable handle 4, the interconnecting member is preferably arcuate in the horizontal plane so as to match the arcuate periphery 34 of the projecting rim 10 on the griddle 2. The support member 26 is not limited to the U-shape and could take any form which would provide a stable support for the griddle. Furthermore, the removable handle 4 of the present invention does not need to be made from two pieces of cold rolled steel, or even from cold rolled steel. For example, the handle 4 can be molded or cast and can made from any rigid material.

Referring back to FIG. 2, the griddle 2 has a hole 18 and a slot 20 on each of the two opposing projecting rims 10 for receiving and engaging with two removable handles 4. The holes 18 are preferably round and the slots are preferably elliptical but can be any other shape depending upon the cross section of the handles 4 and the distance from the hole 18 to the periphery 34 of the rim 10. To engage the removable handles 4 with the griddle 2, the J-shaped vertical arms 24 are used as a hooks for lifting the griddle 2, wherein the upwardly directed prongs 36 of the vertical arms 24 are inserted into the holes 18 in the projecting rims 10, as shown in FIG. 1. Given that the projecting rims 10 extend past the edges 16 of the grill 6, the depending support members 26 will not interfere with the grill cooking surface 8 because the support members 26 will also be outside of the edges 16 of the grill.

When the prongs 36 of the vertical arms 24 are inserted into the holes 18 and the griddle 2 is lifted, the vertical arms 24 are necessarily positioned in the slots 20, as is better shown in FIG. 11. The engagement of the slots 20 with the vertical arms 24 serves to prevent twisting of the griddle 2 about the axis of the prongs 36 and about the longitudinal axis of the griddle 2. In an alternative embodiment of the present invention, the slots 20 are not present. Instead, the holes 18 would be located nearer to the periphery 34 of the projecting rims 10. In such an embodiment, the engagement of the prongs 36 with the inside surfaces 38 of holes 18 will serve to prevent twisting about the longitudinal axis of the griddle 2 and contact between the vertical arm 24 and the periphery 34 of the rim 10 will prevent twisting about the axis of the prong 36, albeit there will be less twisting if the slot 20 is present.

While the preferred embodiment has one hole 18 and one slot 20 for each handle 4, an alternative embodiment of the handle 4 could comprise of a plurality of upwardly directed prongs 24, which would require the use of a plurality of holes 18.

Figure 9:
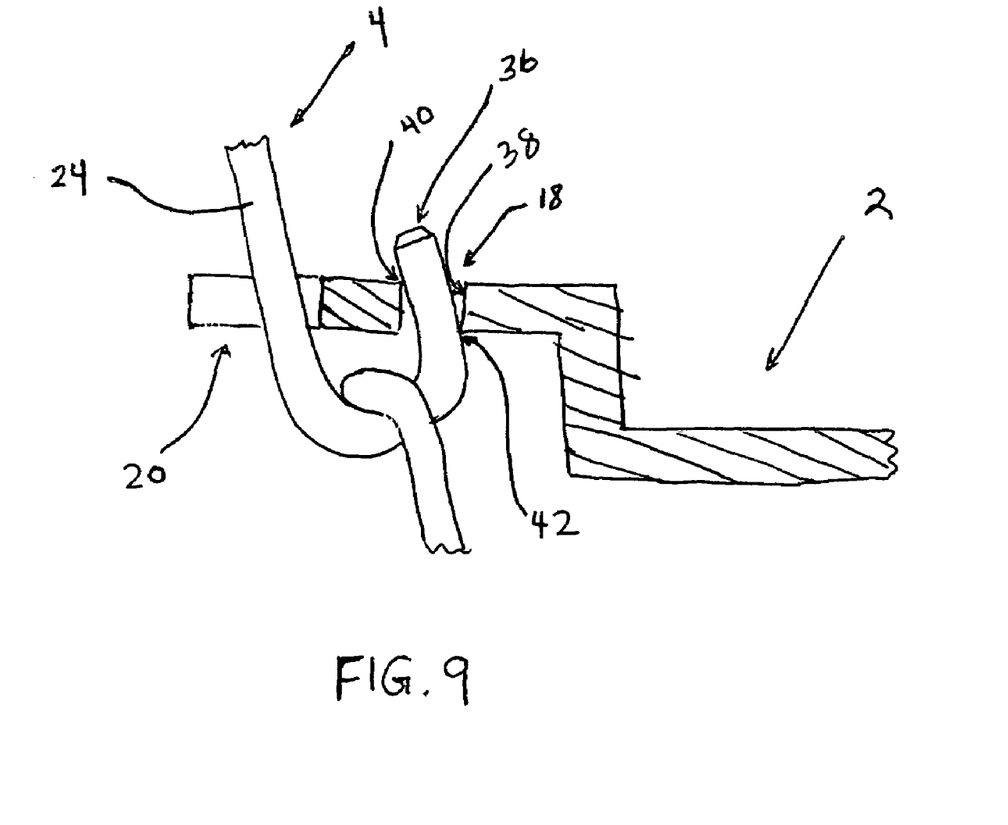
FIG. 9 is a close-up view of the engagement between the upwardly directed prong of the handles and the holes of the griddles.

When a griddle 2 of the present invention is set on a flat surface 44 while engaged with the removable handles 4, the support members 26 serve to support and elevate the griddle 2, as shown in FIG. 4. The legs 28 of the support members 26 are inwardly biased; i.e. the legs 28 of each handle 4 are directed inwardly towards each other. In such a configuration, the weight of the griddle is concentrated at contact points 40 and 42 between the prongs 36 and the inside surfaces 38 of the holes 18, as is shown in more detail in FIG. 9. Essentially, the handle 4 acts as a lever wherein the force exerted by the surface 44 on the legs 28 of the handle 4 is balanced by forces exerted at a contact point at the upper outside edge 40 and at a contact point at the lower inside edge 42 of the inside surface 38 of the hole 18. In an alternative embodiment, the legs 28 could be outwardly biased which would cause contact points at the upper inside edge and lower outside edge of the hole 18. Depending upon the location of the interconnecting member 32 and various other dimensional characteristics, the outwardly biased configuration could cause some of the forces to be distributed at a contact point between the top of the interconnecting member 32 and the bottom of the rim 10 and possibly at a contact point between the vertical arm 24 and the slot 20.

Two embodiments of the handle 4 are shown in FIG. 4. The first, on the right, has relatively straight legs. To prevent scratching of the flat surface 44, the legs 28 of the first embodiment are preferably capped with a soft material such as rubber. In the second embodiment, as shown on the left of FIG. 4, the legs 28 can be turned back 180° such that contact between the flat surface 44 and the legs 28 occurs at the bends 46 in the legs.

Although the inventions described and claimed herein have been described in considerable detail with reference to certain preferred embodiments, one skilled in the art will appreciate that the inventions described and claimed herein can be practiced by other than the preferred embodiments, which have been presented for purposes of illustration and not of limitation. Therefore, the spirit and scope of the appended claims should not be limited to the description of the preferred embodiments contained herein.

We claim:

1. A cooking device comprising:
a cooking utensil;
at least one removable handle for engagement with the cooking utensil;
each of the at least one removable handle having an upwardly projecting prong being in removable engagement with a hole in the cooking utensil;
the at least one removable handle having at least one support member extending therefrom, the at least one support member contacting a surface and elevating the cooking utensil above the surface;
the quantity of the at least one removable handle being two;
the cooking utensil having two opposing projecting rims, each having at least one hole and at least one slot for receiving the two removable handles;
the two removable handles each having an arm, an at least one upwardly projecting prong, and a gripping member;
the arm downwardly extending from the gripping member and terminating in the at least one upwardly projecting prong, the arm and the at least one upwardly projecting prong being adapted to engage with the cooking utensil, whereby the at least one upwardly projecting prong is positioned within the at least one hole and the arm is positioned within the at least one slot; and,
the support member extending downwardly from the arm.

2. The cooking device of claim 1 wherein:
the cooking utensil is a griddle.

3. The cooking device of claim 1 wherein:
the two removable handles are formed from cold rolled steel.

4. A cooking device comprising:
two removable handles for engagement with a cooking utensil;
the two removable handles each having a support member extending therefrom, each support member being adapted to contact a surface and to support and elevate the cooking utensil above the surface;
the cooking utensil having at least one projecting rim, the at least one projecting rim having at least two holes, each of which are on opposing sides of the cooking utensil;
the two removable handles each having at least one upwardly projecting prong for engagement with the at least two holes, whereby the upwardly projecting prongs are positioned within the holes; and,
at least one of the two removable handles having a generally horizontal member which extends from a lower portion of the upwardly projecting prong whereby the generally horizontal member is adapted to contact an underside of the cooking utensil at a first point on one side of the hole and at a second point on an opposite side of the hole.

5. The cooking device of claim 4 wherein:
the cooking utensil has at least two slots, each of which are on opposing sides of the cooking utensil and which are aligned with the at least two holes; and,
the two removable handles each have at least one arm for engagement with the at least two slots, whereby the arms are positioned within the slots.

6. The cooking device of claim 5 wherein:
the cooking utensil is a griddle.

7. The cooking device of claim 4 wherein:
the cooking utensil has two holes and two slots in the at least one projecting rim for receiving the two removable handles;
the two removable handles each having an arm and a gripping member;
the arm downwardly extends from the gripping member and is terminated in the upwardly projecting prong for engaging with the utensil through the hole; and,
the support member extends downwardly from the arm.

8. The cooking device of claim 4 wherein:
the two removable handles are formed from cold rolled steel.

9. The cooking device of claim 4 wherein:
the support member of each removable handle is further comprised of at least two legs which depend from the generally horizontal member.

10. The cooking device of claim 9 wherein:
the at least two legs are terminated with a one hundred eighty degree (180°) bend such that the legs contact the flat surface as the bend to prevent scratching of the flat surface.

11. The cooking device of claim 9 wherein:
each of the at least two legs are coated to prevent scratching of the flat surface.

12. The cooking device of claim 9 wherein:
each of the at least two legs are coated with a material selected from the group including rubber and plastic.

13. A cooking device comprising:
a cooking utensil;
two removable handles for engagement with a cooking utensil;
the cooking utensil having two opposing and generally horizontal projecting rims;
the two projecting rims each having one hole and one slot for receiving the two removable handles;
the two removable handles each having a support member, an arm, and a gripping member;
the arm downwardly extending from the gripping member and being terminated in an upwardly projecting prong for engaging with the cooking utensil through the hole; and,
the support member having two legs extending downwardly from the arm for contacting a surface and supporting and elevating the cooking utensil above the surface.

14. The cooking device of claim 13 wherein:
the cooking utensil is a griddle.

15. The cooking device of claim 13 wherein:
the two removable handles are formed from cold rolled steel.

16. The cooking device of claim 13 wherein:
the two legs are terminated with a one hundred eighty degree (180°) bend such that the legs contact the flat surface as the bend to prevent scratching of the flat surface.

17. The cooking device of claim 13 wherein:
each of the two legs have a foot to prevent scratching of the flat surface.

18. The cooking device of claim 17 wherein
the feet are made from a material selected from the group including rubber and plastic.

19. A cooking device comprising:
a first removable handle and a second removable handle;
a utensil having at least one projecting rim;
the at least one projecting rim having a first hole and a first slot which are approximately longitudinally opposite a second hole and a second slot wherein the first and second holes and the first and second slots are for receiving the first and the second removable handle;
the first hole being for receiving an upwardly projecting prong of the first removable handle and the first slot being for receiving an elongated arm of the first removable handle; and,
the second hole being for receiving an upwardly projecting prong of the second removable handle and the second slot being for receiving an elongated arm of the second removable handle.

20. The cooking device of claim 19 wherein:
the cooking utensil is a griddle.

21. The cooking device of claim 20 wherein:
the quantity of the at least one projecting rim is two; and,
the two projecting rims are longitudinally opposite each other.

* * * * *